United States Patent
Takagi

[19]

[11] Patent Number: 5,932,952
[45] Date of Patent: Aug. 3, 1999

[54] VIBRATION MOTOR HAVING A TWO-PHASE DRIVE OF A LONGITUDINAL VIBRATION AND A BENDING VIBRATION MODE

[75] Inventor: Tadao Takagi, Yokohama, Japan

[73] Assignee: Nikon Corporation, Tokyo, Japan

[21] Appl. No.: 08/707,760

[22] Filed: Sep. 4, 1996

Related U.S. Application Data

[63] Continuation of application No. 08/355,010, Dec. 13, 1994, abandoned.

[30] Foreign Application Priority Data

Dec. 14, 1993 [JP] Japan .................................. 5-342630

[51] Int. Cl.⁶ ........................................................ H02N 2/00
[52] U.S. Cl. ............................... 310/323.02; 310/316.02
[58] Field of Search ..................................... 310/316, 317, 310/323, 328

[56] References Cited

U.S. PATENT DOCUMENTS

| | | | |
|---|---|---|---|
| 3,656,217 | 4/1972 | Scott et al. | 29/25.35 |
| 3,904,274 | 9/1975 | Feinleib et al. | 350/161 |
| 4,510,411 | 4/1985 | Hakamata et al. | 310/316 |
| 4,533,219 | 8/1985 | Aldrich | 310/317 |
| 4,734,610 | 3/1988 | Okumura et al. | 310/323 |
| 4,742,260 | 5/1988 | Shimizu et al. | 310/323 |
| 4,857,791 | 8/1989 | Uchino et al. | 310/321 |
| 4,914,337 | 4/1990 | Takagi | 310/316 |
| 4,935,659 | 6/1990 | Naka et al. | 310/328 |
| 5,039,899 | 8/1991 | Yamaguchi | 310/323 |
| 5,200,665 | 4/1993 | Iijima | 310/323 |
| 5,416,375 | 5/1995 | Funakubo et al. | 310/323 |
| 5,448,127 | 9/1995 | Kanazawa | 310/323 |
| 5,453,653 | 9/1995 | Zumeris | 310/323 |
| 5,665,918 | 9/1997 | Takano et al. | 310/323 |

FOREIGN PATENT DOCUMENTS

| | | | |
|---|---|---|---|
| 0277477 | 11/1988 | Japan | 310/323 |
| 0283473 | 11/1988 | Japan | 310/323 |
| 6106028 | 11/1988 | Japan | 310/328 |
| 63-277477 | 11/1988 | Japan | H02N 2/00 |
| 0126178 | 5/1989 | Japan | 310/323 |
| 0202382 | 8/1990 | Japan | 310/323 |
| 0045175 | 2/1991 | Japan | 310/323 |
| 5091766 | 4/1993 | Japan | 310/323 |

OTHER PUBLICATIONS

Ultrasonic Motors Theory and Applications, S. Ueha, Y. Tomikawa, M. Kurosawa, N. Nakamura, 1993, Clarendon Press, Oxford, all pages.

Piezoelectric Linear Motors for Application to Driving a Light Pick–Up Element, Y. Tomikawa, M. Aoyagi, T. Ogasawara, A. Yabukl, Jun. 9–11, 1993, Tohoku Institute of Technology, Sendai, all pages.

*Primary Examiner*—Thomas M. Dougherty

[57] ABSTRACT

A vibration motor having an elastic body which is conductive, first and second piezoelectric elements which are joined with the elastic body, which harmonically cause a longitudinal vibration mode and a bending vibration mode to be generated on the elastic body, and which produce elliptical movement on the output take off position of the elastic body, and a third piezoelectric element which is joined with the elastic body, and which converts the vibrations produced on the elastic body to electric signals.

31 Claims, 7 Drawing Sheets

VIBRATION MOTOR HAVING A TWO-PHASE DRIVE OF A LONGITUDINAL VIBRATION AND A BENDING VIBRATION MODE

This application is a continuation of application Ser. No. 08/355,010, filed Dec. 13, 1994, now abandoned.

BACKGROUND OF THE INVENTION

1. Field of the Invention

The present invention relates to vibration motor that generates a drive force by producing elliptical movement in a rod-shaped elastic body, and in particular, it relates to a vibration motor which has a two-phase drive of a longitudinal vibration mode and a bending vibration mode.

2. Description of the Related Art

Figure 6:
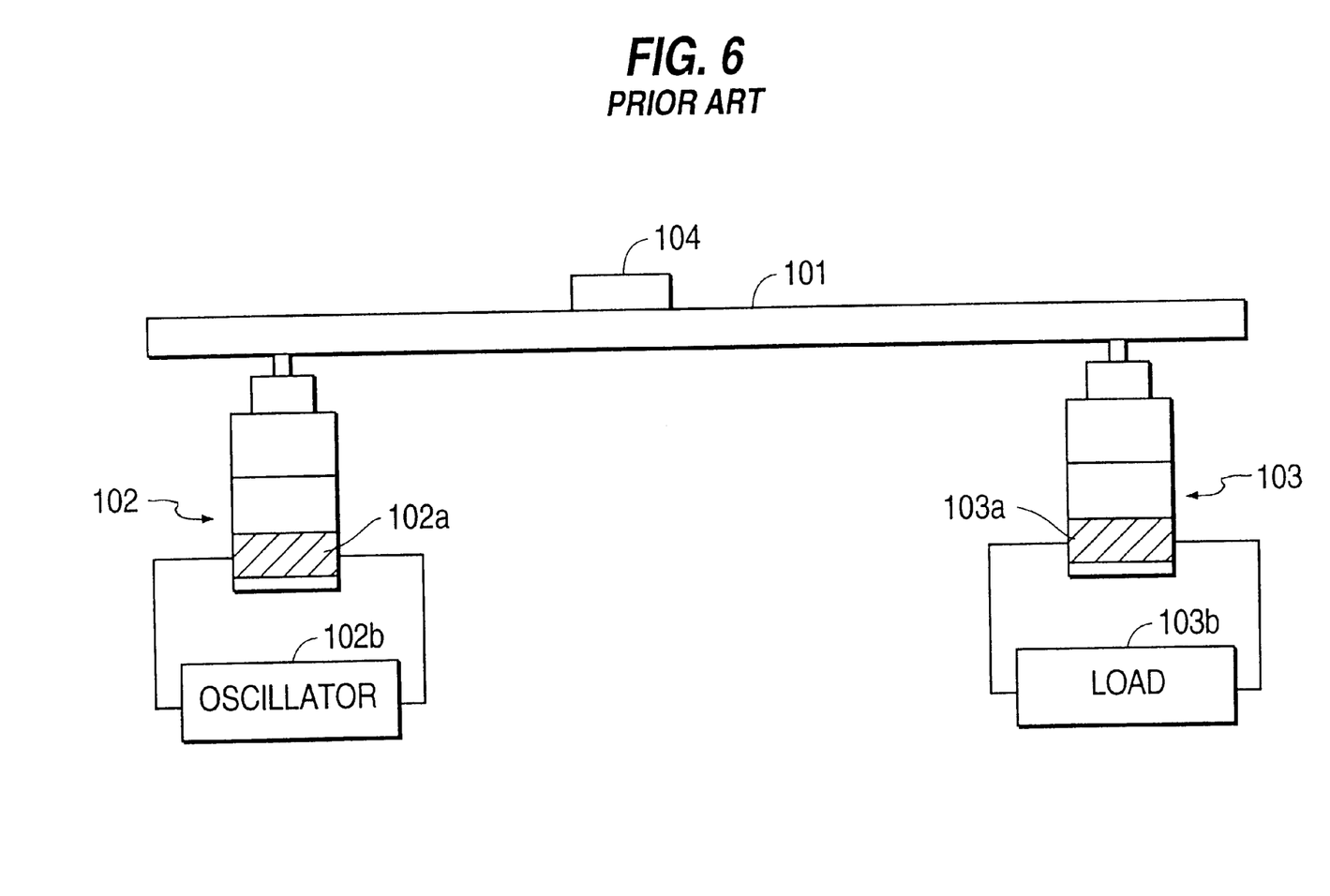
FIG. 6 is a diagram showing a conventional linear type vibration motor.

FIG. 6 is a diagram indicating a conventional linear type vibration motor. With the conventional linear type vibration motor, an excitation transformer 102 is arranged on one edge of a rod-shaped elastic body 101, and a damping transformer 103 is positioned on the other side. Vibrators 102a and 103a are joined to transformers 102 and 103. By applying alternate current from an oscillator 102b to excitation vibrator 102a, rod-shaped elastic body 101 is made to oscillate, and this vibration is a progressive wave propagated on rod-shaped elastic body 101. A moving body 104, which is pressure joined to rod-shaped elastic body 101, is driven by this progressive wave.

Meanwhile, the vibration of rod-shaped elastic body 101 is transmitted to vibrator 103a through damping transformer 103, and the vibration energy is converted to electrical energy by this vibrator 103a. Load 103b connected to this vibrator 103a absorbs the vibrations based on the fact that electrical energy is consumed. The damping transformer 103 prevents the production of standing waves of a mode inherent to rod-shaped elastic body 101 by suppressing the reflection of the end surface of rod-shaped elastic body 101.

The linear type vibration motor shown in FIG. 6 has problems such as only having a moveable range of moving body 104, rod-shaped elastic body 101 must be long, the entire length of rod-shaped elastic body 101 must be made to vibrate, and the motor must be made large scale. In addition, in order to prevent the generation of standing waves of a particular mode, damping transformer 103, for example, is necessary.

To resolve this kind of problem, a variety of self-advancing type vibration motors have been proposed. For example, there is the "asymmetric degeneracy longitudinal L1-bending B4 mode-flat plate motor" which is listed in "222 Piezo Linear Motors for the Purpose of Optical Pickup Movement" of the "Proceedings of the Fifth Electromagnetic Force Dynamics Symposium".

Figure 7A:
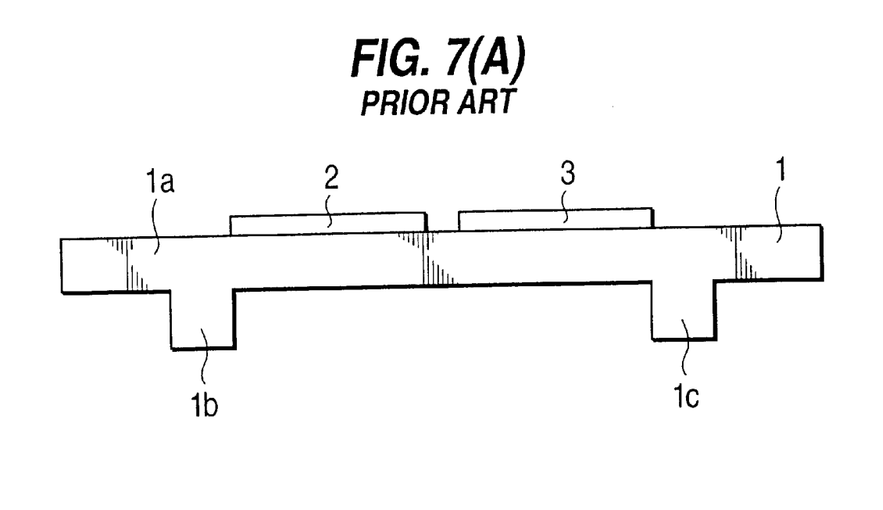
FIG. 7(A) is a front view of a conventional heteromorphic degeneracy longitudinal L1-bending B4 mode-flat plate motor.
Figure 7B:
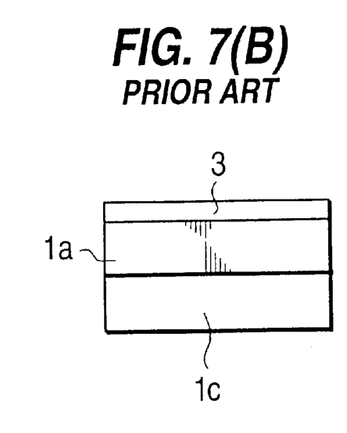
FIG. 7(B) is a side view of a conventional heteromorphic degeneracy longitudinal L1-bending B4 mode-flat plate motor.
Figure 7C:
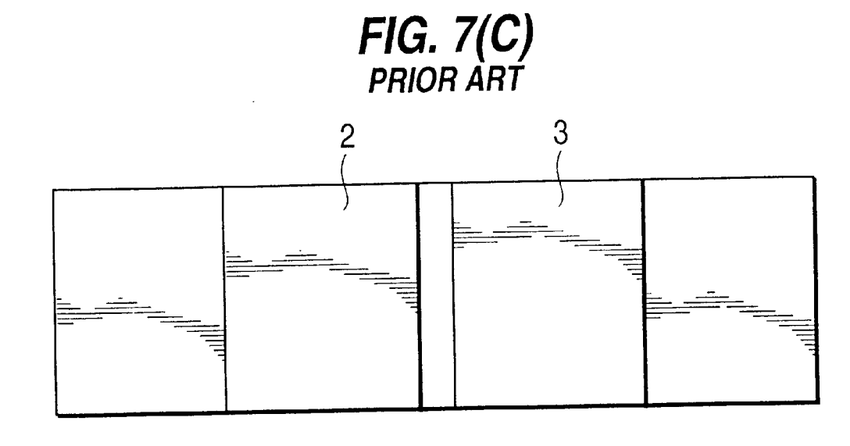
FIG. 7(C) is a top view of a conventional heteromorphic degeneracy longitudinal L1-bending B4 mode-flat plate motor.

FIG. 7(A) is a front view diagram, FIG. 7(B) is a side view diagram, and FIG. 7(C) is a top view diagram of a conventional example of a heteromorphic degeneracy longitudinal L1-bending B4 mode-flat plate motor.

Elastic body 1 comprises a rectangular wave flat plate shaped base part 1a, and protruding parts 1b and 1c are formed on one surface of base part 1a. Piezoelectric elements 2 and 3 are fixed to the other side of the base part 1a of elastic body 1, and they are elements that generate a longitudinal vibration L1 mode and a bending vibration B4 mode.

Protruding parts 1b and 1c of elastic body 1 are provided on the antinode position of the bending vibration B4 movement which is generated on base part 1a, and are pushed by such relative movement members as guide rails (not shown in the diagram).

However, the motor described above in FIGS. 7(A) through 7(C) has the problem that it can not be optimally controlled because the status of the vibrations of the elastic body 1 can not be detected.

SUMMARY OF THE INVENTION

Accordingly, it is an object of the present invention to provide a vibration motor that prevents the generation of standing waves of a particular mode.

It is another object of the present invention to provide a vibration motor that can be optimally controlled.

Additional objects and advantages of the invention will be set forth in the description which follows and, in part, will be obvious from the description, or may be learned by practice of the invention.

Objects of the present invention are achieved by providing a vibration motor comprising an elastic body which is conductive, first and second electromechanical conversion elements which are joined with the elastic body, which harmonically cause a longitudinal vibration mode and a bending vibration mode to be generated on the elastic body, and which generate elliptical movement on the output take-off position of the elastic body, and a third electro-mechanical conversion element which is jointed to the elastic body, and which converts vibrations generated on the elastic body into electric signals.

The above vibration motor further comprises a fourth electro-mechanical conversion element which is joined to the elastic body, and which transmits the electric potential of the elastic body through an electrode provided on the surface.

According to an aspect of the invention, each of the first through fourth electro-mechanical conversion elements are provided in a single electromechanical conversion material.

According to another aspect of the invention, the third and fourth electro-mechanical conversion elements of the above ultrasonic motor are provided such that they are outside the first and second electromechanical conversion elements, and are positioned symmetrically.

According to still yet another aspect of the invention, the electrode of the fourth electro-mechanical conversion element provided on the elastic body is electrically connected with the elastic body using a conductive resin.

According to embodiments of the present invention, a vibration motor can be easily controlled because an electro-mechanical conversion element for the purpose of detecting the status of the elastic body vibration is provided, so that the vibrations may be easily controlled.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1A:
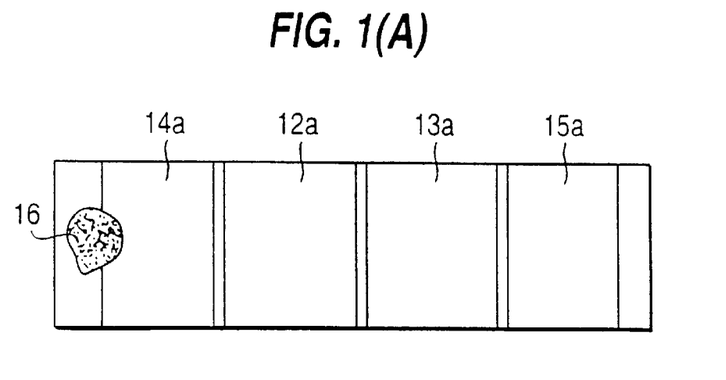
FIG. 1(A) is a top view of a vibration motor according to a first embodiment of the present invention.
Figure 1B:
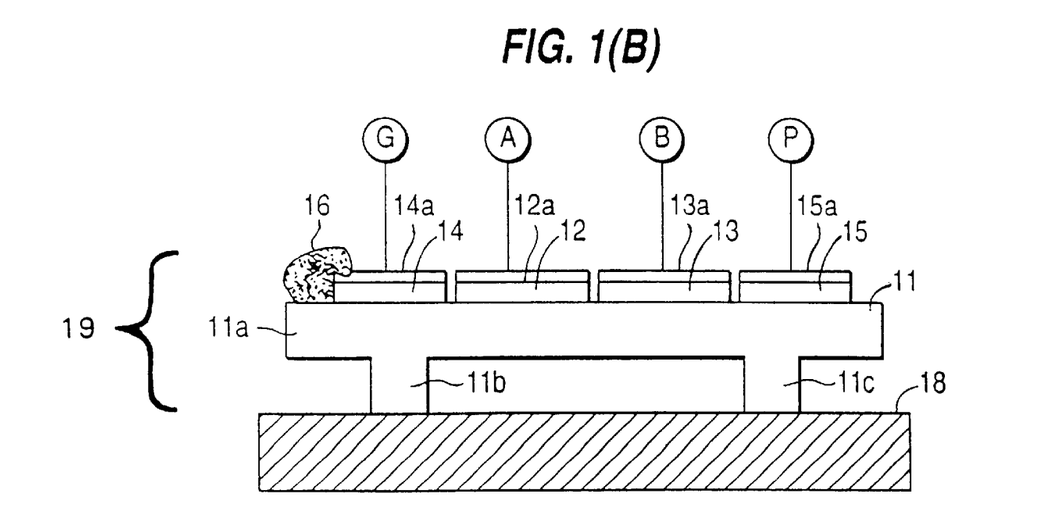
FIG. 1(B) is a front view of the vibration motor of FIG. 1(A) according to the first embodiment of the present invention.
Figure 1C:
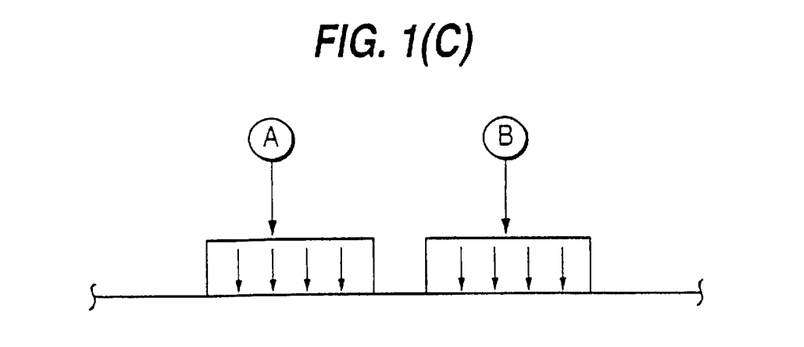
FIG. 1(C) is a diagram showing polarization of two piezoelectric elements shown in FIG. 1(B).

FIG. 1(A) is a top view and FIG. 1(B) is a front view of a ultrasonic vibration motor according to a first embodiment of the present invention, whereas FIG. 1(C) shows a polarization of two piezoelectric elements shown in FIG. 1(B).

An elastic body 11 has a base part 11a and two protuberances 11b and 11c, and piezoelectric elements 12 and 13 are arranged on base part 11a. The functions of these elements are the same as those indicated in FIG. 7 described above.

Piezoelectric elements 12 and 13 generate longitudinal vibration L1 mode and bending elasticity B4 mode, and are affixed to the surface of elastic body 11. Electrode 12a is baked onto the surface of piezoelectric element 12, and voltage from terminal A is applied to piezoelectric element 12 through electrode 12a. Moreover, electrode 13a is baked onto the surface of piezoelectric element 13, and voltage from terminal B is applied to piezoelectric element 13 through electrode 13a.

The directions of polarization in relation to the directions of thickness of piezoelectric element 12 and of piezoelectric element 13 are mutually in the same direction. Moreover, the voltage of terminal A and the voltage of terminal B have the same frequency and their phases have a discrepancy of only $\pi/2$.

Figure 2A:
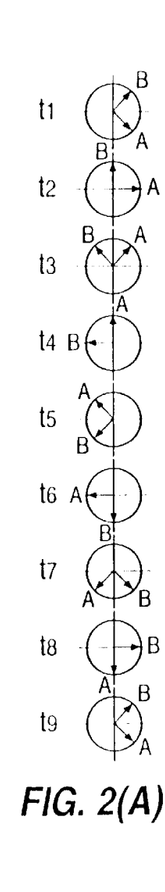
FIG. 2(A) is a diagram showing temporal changes of two-phase input voltages that are input to the vibration motor of FIG. 1(B)

In this embodiment, piezoelectric elements 12 and 13 are polarized as shown in FIG. 1(C), and two-phase input voltages A and B are applied as indicated in FIG. 2(A) described later.

Moreover, piezoelectric element 14 is bonded to the surface of elastic body 11, and electrode 14a is baked on top of that. The surface of electrode 14a contacting piezoelectric element 14 has the same electric potential as elastic body 11 and the surface of the opposite side of the piezoelectric element 14, and that electric potential is transmitted to the G terminal through conductive coating material 16. Even if attempting to directly affix terminal G to elastic body 11 by soldering, etc., the temperature required for deposition escapes into elastic body 11. Thus, in this embodiment, after piezoelectric element 14 has been bonded to the surface of the elastic body 11, the terminal G, through electrode 14a and conductive coating material 16 is connected to elastic body 11.

Piezoelectric element 15 is affixed to the surface of elastic body 11, and electrode 15a is baked onto the surface thereof. The status of the vibration of elastic body 11 is found by converting the vibration to electric signals by piezoelectric element 15, and then transmitting these electric signals to terminal P through the electrode 15a. The vibration status of the quaternary bending vibration B4 mode and the vibration status of the primary longitudinal vibration L1 mode are included in this electric signal in a form that combines the two differing vibration modes. Thus, signals of a size roughly corresponding to the combined vibration amplitudes in elastic body 11 can be obtained.

In addition, electrodes 12a and 13a, as well as electrodes 14a and 15a, have the same dimensions respectively, and are positioned symmetrically to the right and left. For this reason, they obtain the same characteristics.

Figure 1D:
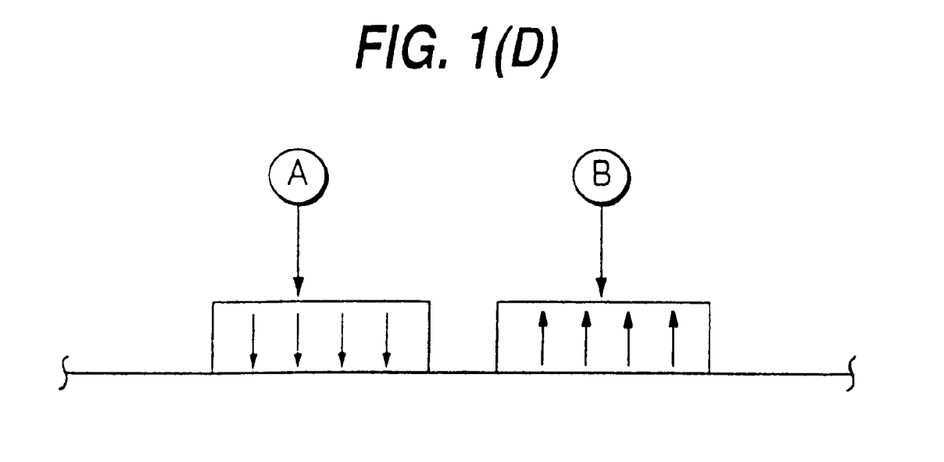
FIG. 1(D) is a diagram showing different polarization from that shown in FIG. 1(C), of the two piezoelectric elements shown in FIG. 1(B).

As indicated in FIGS. 1(A) through 1(C), this vibration motor has a configuration in which composite vibrations of bending vibrations and longitudinal vibrations occur by the application of high frequency voltages A and B on the two piezoelectric elements 12 and 13, respectively, and a drive force is produced from this by generating elliptical movement on the ends of protuberances 11b and 11c. Here, G is the ground potential. Moreover, the two piezoelectric elements 12 and 13 are polarized so that they have mutual polarity in the same direction, and high frequency voltages A and B have a temporal phase difference of $\pi/2$. However, the polarization of the two piezoelectric elements 12 and 13 may also be in mutually opposite directions as shown in FIG. 1(D).

Figure 2B:
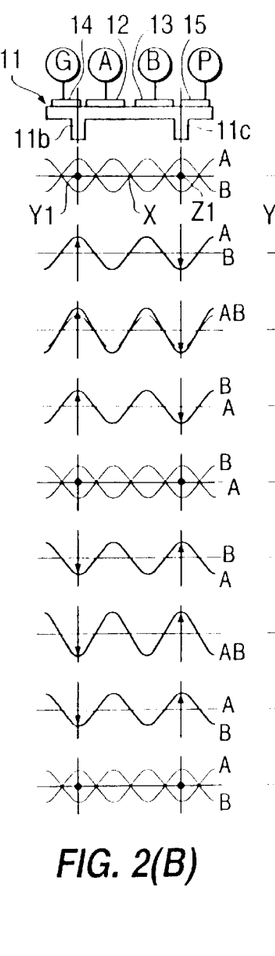
FIG. 2(B) is diagram showing the conditions of deformation of a cross-section of the vibration motor of FIG. 1(B) and indicating the temporal changes of the bending vibrations which are generated by the same vibration motor.
Figure 2C:
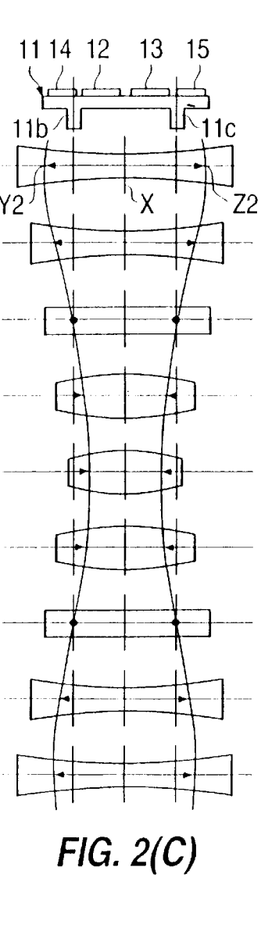
FIG. 2(C) is a diagram showing the conditions of deformation of a cross-section of the vibration motor and the temporal changes (t1–t9) of the longitudinal vibrations generated by the same vibration motor.
Figure 2D:
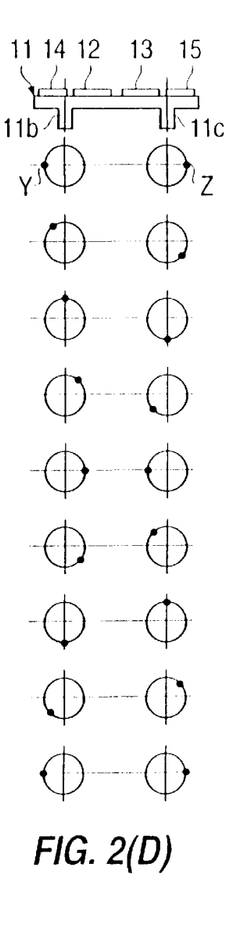
FIG. 2(D) is a diagram showing the temporal changes (t1–t9) of the elliptical movement that the vibration motor of FIG. 1(B) generates on protuberances 11b and 11c.

FIG. 2(A) shows the temporal changes of the two-phase high frequency voltages A and B that are input to the vibration motor at times t1–t9. The horizontal axis of FIG. 2(A) indicates the effective value of the high frequency voltage. FIG. 2(B) shows the conditions of deformation of a cross section of the vibration motor, and indicates the temporal changes (t1–t9) of the bending vibrations which are generated by the vibration motor. FIG. 2(C) shows the conditions of deformation of a cross section of the vibration motor, and indicates the temporal changes (t1–t9) of the longitudinal vibrations generated by the vibration motor. FIG. 2(D) shows the temporal changes (t1–t9) of the elliptical movement that the vibration motor generates on protuberances 11b and 11c.

Next, the operation of the vibration motor of the first embodiment will be explained for each temporal change (t1–t9).

At time t1, as indicated in FIG. 2(A), high frequency voltage A generates positive voltage, and high frequency voltage B generates an equal positive voltage in the same way. As indicated in FIG. 2(B), the bending movement based on high frequency voltages A and B cancel each other out, and material points Y1 and Z1 have zero amplitude. Also, as indicated in FIG. 2(C), the longitudinal vibration based on high frequency voltages A and B are generated in the elongating direction. As indicated by the arrows, material points Y2 and Z2 indicate the maximum elongation when segment X is taken to be the center. Resulting from this, as indicated in FIG. 2(D), both of the above vibrations are combined, with the combination of material points Y1 and Y2 making up the movement of material point Y, and also, the combination of the movement of material points Z1 and Z2 making up the movement of material point Z.

At time t2, as indicated in FIG. 2(A), high frequency voltage B is zero, and high frequency voltage A generates a positive voltage. FIG. 2(B) shows that the bending movement generated by high frequency voltage A material point Y1 oscillates in the positive direction, and material point Z1 oscillates in the negative direction. Moreover, as shown in FIG. 2(C), longitudinal vibration is generated by high frequency voltage A, and material point Y2 and material point Z2 contract more than at time t1. As a result, as shown in FIG. 2(D), both the bending movement and longitudinal vibrations combine, and material points Y and Z move by circulating clockwise relative to time t1.

At time t3, as shown in FIG. 2(A), high frequency voltage A generates positive voltage, and at the same time, high frequency voltage B generates an equal negative voltage. As shown in FIG. 2(B), the bending movement caused by high frequency voltages A and B combine and are amplified, material point Y1 is amplified in the positive direction more than at time t2, and indicates the maximum positive amplitude value. Material point Z1 is amplified in the negative direction more than at time t2, and indicates the maximum negative amplitude value. Moreover, as shown in FIG. 2(C), the longitudinal bending caused by high frequency voltages A and B cancel each other out, and material points Y2 and Z2 return to their original positions. As a result, as shown in FIG. 2(D), both of the above vibrations combine, and material points Y and Z move by circulating clockwise relative to time t2.

At time t4, as shown in FIG. 2(A), high frequency voltage A becomes zero, and high frequency voltage B generates negative voltage. As shown in FIG. 2(B), bending movement is generated by high frequency voltage B, and the amplitude of material point Y1 is lower than at time t3, and the amplitude of material point Z1 is lower than at time t3. Moreover, as shown in FIG. 2(C), longitudinal bending is generated by high frequency voltage B, and material points Y2 and Z2 contract. As a result, as shown in FIG. 2(D), both of the above vibrations combine, and material points Y and Z move by circulating clockwise relative to time t3.

At time t5, as shown in FIG. 2(A), high frequency voltage A generates negative voltage, and at the same time high frequency voltage B generates an equal negative voltage. As shown in FIG. 2(B), the bending movement based on high frequency voltages A and B cancel each other out, and material points Y1 and Z1 become zero amplitude. Moreover, as shown in FIG. 2(C), the longitudinal bending based on high frequency voltages A and B is generated in the contracting direction. As shown by the arrows, material points Y2 and Z2 indicate the maximum contraction when segment X is taken to be the center. As a result, as shown in FIG. 2(D), both of the above vibrations combine, and material points Y and Z move by circulating clockwise relative to time t4.

Following the changes at time t6–t9, bending movement and longitudinal bending are generated in the same way as the principles described above, and as a result, as indicated in FIG. 2(D), material point Y and material point Z move by circulating clockwise, and undergo elliptical movement.

According to the principles above, this type of vibration motor is configured to generate a drive force by generating elliptical movement at the ends of output take off members (protuberances) 11b and 11c. Consequently, when applying the ends of protuberances 11b and 11c to a stator 19, elastic body 11 self-advances in relation to fixed part 18.

Figure 3:
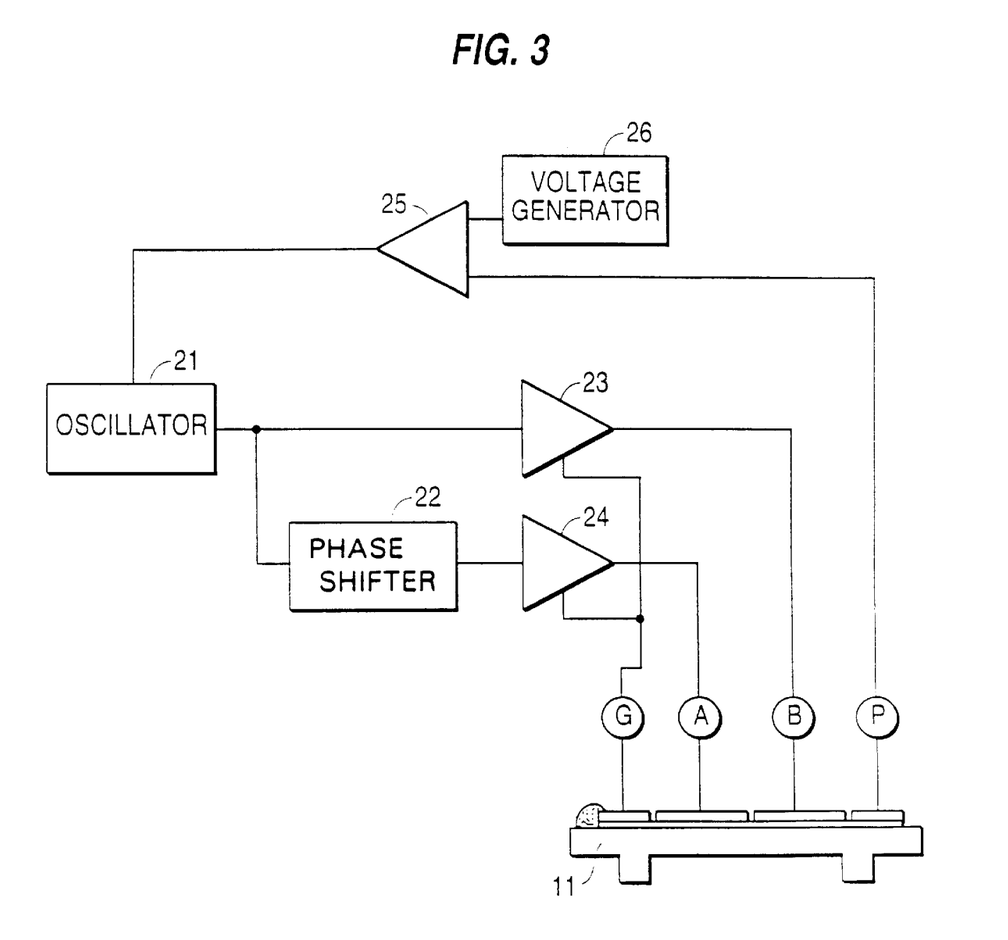
FIG. 3 is a block diagram showing a drive control circuit of the motor according to the first embodiment.

FIG. 3 is a block diagram showing the drive control circuit of a vibration motor according to the first embodiment. The output from oscillator 21 is frequencies corresponding to the quaternary bending vibration B4 mode and primary longitudinal vibration L1 mode of the members configured from elastic body 11 and piezoelectric elements 12–15. Phase shifter 22 produces a $\pi/2$ phase difference on the output of the oscillator 21, to effect the same difference between the high frequency voltage signals A and B. The output of amplifier 24 is input to electrode 12a through terminal A, and the output of amplifier 23 is input to electrode 13a through terminal B.

The output of terminal P is input to comparator 25. Comparator 25 compares a pre-set voltage from standard voltage generator 26 with the output of terminal P, and oscillator 21 is controlled such that when the output of terminal P is small, the frequency is lowered, or if the output of terminal P is large, the frequency is increased. By doing this, the vibration amplitude of the vibration motor may be maintained at a fixed level.

Figure 4:
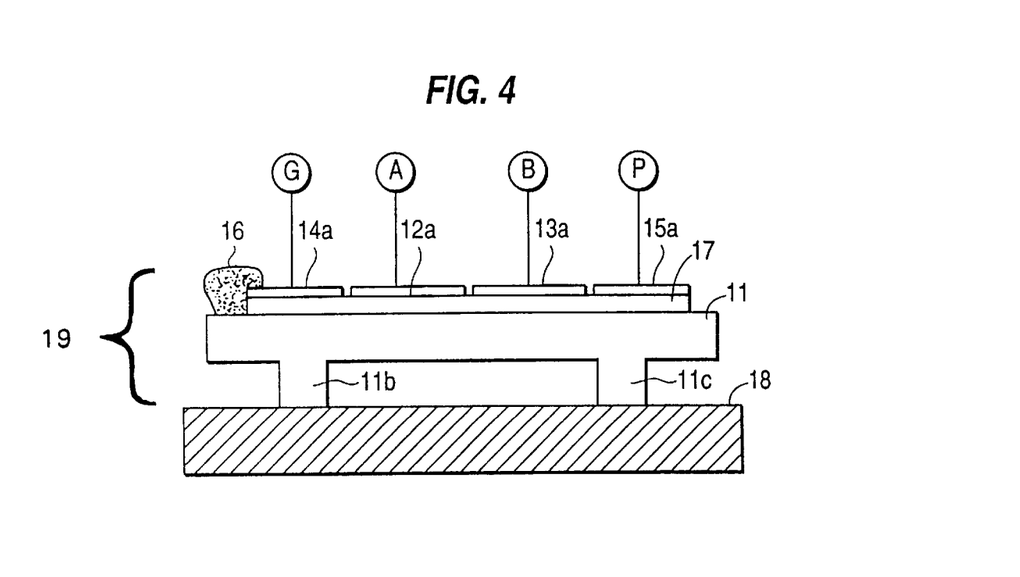
FIG. 4 is a diagram of a vibration motor according to a second embodiment of the present invention.

FIG. 4 is a diagram of a vibration motor according to a second embodiment of the present invention.

The parts of the motor in the second embodiment which have the same functions as in the first embodiment are given the same reference numerals, and redundant explanations are omitted.

In the vibration motor of the second embodiment, a single piezoelectric element 17 for comprising piezoelectric elements 12, 13, 14, and 15 of the first embodiment is affixed onto the surface of elastic body 11, and the electrodes 12a, 13a, 14a, and 15a are baked onto that surface. If this is done, piezoelectric element 17 can be affixed in one operation, and manufacturing is simplified.

Figure 5A:
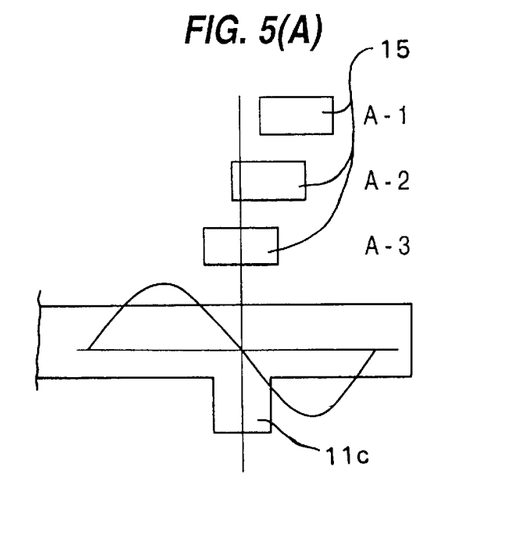
FIG. 5(A) is a diagram for explaining the installation position of one of the electro-mechanical conversion elements of a vibration motor according to the first and second embodiments of the present invention.

FIG. 5(A) is a diagram explaining positions for installing the piezoelectric element 15 of the vibration motor according to the first embodiment of the present invention. If the piezoelectric (detecting vibration) element 15 is provided at a position A-3 relative to the elastic body 11 as shown in FIG. 5(A), the piezoelectric (detecting vibration) element 15 can not detect a vibration of the elastic body 11 because of the positioning of a node of vibration of the elastic body 11. If the piezoelectric (detecting vibration) element 15 is provided at a position A-2 relative to elastic body 11, the piezoelectric element (detecting vibration) element 15 is capable of detecting a vibration of the elastic body 11 because of escaping a node position of vibration of the elastic body 11. If the piezoelectric (detecting vibration) element 15 is provided at a position A-1 relative to the elastic body 11, the piezoelectric (detecting vibration) element 15 is capable of detecting a vibration of the elastic body 11 better than the case shown for position A-2 because of escaping a node position of vibration of the elastic body 11.

Figure 5B:
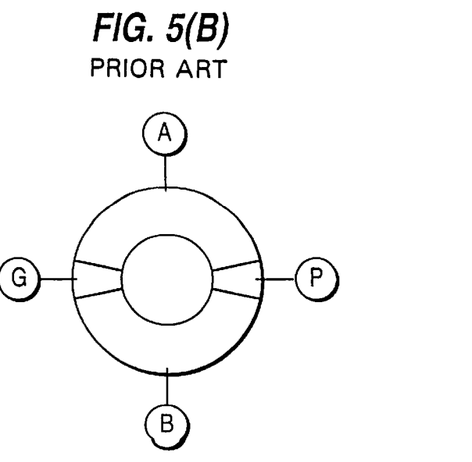
FIG. 5(B) is a diagram showing a conventional circular shaped motor.

In FIG. 5(B), there is shown a known circular shape vibration motor on which the piezoelectric elements have been connected to pick up terminal P. Reference is made to Japanese Patent Publication Number Sho 58-77380 and U.S. Pat. No. 4,510,411 for a further explanation of this type of motor. However, because there are no vibration sections as in the vibration motor according to the embodiments of the present invention, the circular shaped vibration motor may have any position on the surface of the elastic body.

In the embodiments of the present invention, piezoelectric element 15 for vibration detection is provided in a position that avoids being directly over the vibration section (position A-1). If the piezoelectric element 15 is provided in a position symmetrical to the left and right of the vibration section, the vibrations cancel each other out, and the vibrations of elastic body 11 cannot be detected (position A-3). In addition, if the piezoelectric element 15 is in an asymmetrical position (position A-2), even if one part is directly over the vibration section, detection is possible.

As explained in detail above, and according to the embodiments of the present invention, a vibration motor can be easily controlled because vibrations are controlled by providing electro-mechanical conversion elements for detecting the vibration status of the elastic body.

Although a few preferred embodiments of the present invention have been shown or described, it would be appreciated by those skilled in the art that changes may be made in these embodiments without departing from the principles and spirit of the invention, the scope of which is defined in the claims and their equivalents.

What is claimed is:

1. A vibration motor, comprising:

an elastic body having first and second surfaces opposite each other, said elastic body having conductivity;

first and second electro-mechanical conversion elements, connected to the first surface of said elastic body, to harmonically generate a longitudinal vibration and a bending vibration on said elastic body, and to produce elliptical motions on said elastic body; and a third electro-mechanical conversion element connected to the first surface of said elastic body and arranged at a position such that a center of said third electro-mechanical conversion element is offset from a node of at least one of said longitudinal and bending vibrations on said elastic body, to convert the longitudinal and bending vibrations to electrical signals.

2. The vibration motor as claimed in claim 1, further comprising:

a fourth electro-mechanical conversion element, having an electrode spaced apart from said elastic body, and connected to the first surface of said elastic body, to transmit an electric potential of said elastic body through the electrode.

3. The vibration motor as claimed in claim 1, wherein said first through third electro-mechanical conversion elements are provided in a single electro-mechanical conversion material.

4. The vibration motor as claimed in claim 2, wherein said first through fourth electro-mechanical conversion elements are provided in a single electro-mechanical conversion material.

5. The vibration motor as claimed in claim 2, wherein:

said first through fourth electro-mechanical conversion elements are linearly arranged;

said first and second electro-mechanical conversion elements are adjacent to each other, and said third and fourth electro-mechanical conversion elements are arranged on opposite sides of said first and second electro-mechanical conversion elements; and said third and fourth electro-mechanical conversion elements are symmetrical about an imaginary plane extending perpendicular to the first and second surfaces and between said first and second electro-mechanical conversion elements.

6. The vibration motor as claimed in claim 4, wherein:

said first through fourth electro-mechanical conversion elements are linearly arranged;

said first and second electro-mechanical conversion elements are adjacent to each other, and said third and fourth electro-mechanical conversion elements are arranged on opposite sides of said first and second electro-mechanical conversion elements; and said third and fourth electro-mechanical conversion elements are symmetrical about an imaginary line extending perpendicular to the first and second surfaces of said elastic body and said first and second electro-mechanical conversion elements.

7. The vibration motor as claimed in claim 2, further comprising:

a conductive resin electrically connecting the electrode of said fourth electro-mechanical conversion element with said elastic body.

8. The vibration motor as claimed in claim 4, further comprising:

a conductive resin electrically connecting the electrode of said fourth electro-mechanical conversion element with said elastic body.

9. The vibration motor as claimed in claim 2, wherein said first through fourth electro-mechanical conversion elements are piezoelectric elements.

10. The vibration motor as claimed in claim 1, wherein said elastic body further comprises first and second protuberances extending from the second surface, wherein the elliptical motions are produced at positions of said elastic body corresponding to said first and second protuberances.

11. The vibration motor as claimed in claim 1, wherein an imaginary line which bisects said third electro-mechanical conversion element and is perpendicular to the direction of said longitudinal vibration is offset from the node of at least one of the vibrations on said elastic body.

12. A vibration motor comprising:

a vibration member including an elastic body; and an electro-mechanical converting element which is attached to a plane of the elastic body and has first and second input portions;

wherein said vibration member generates a first vibration and a second vibration by applying a first periodic signal to the first input portion of the electro-mechanical converting element and a second periodic signal with different phases from the first periodic signal to the second input portion of the electro-mechanical converting element, so as to produce elliptic motions on the elastic body without generating a travelling wave; and wherein said electro-mechanical converting element has an output portion which is arranged separately from said first and second input portions and at a position substantially at an antinode of at least one of the first and second vibrations, and converts at least one of the first and second vibrations to an electrical signal.

13. The vibration motor as claimed in claim 12,
wherein said first vibration is a longitudinal vibration which vibrates in a direction substantially parallel to the plane, and the second vibration is a bending vibration which vibrates in a direction substantially perpendicular to the direction of the first vibration.

14. A vibration motor which receives first and second time-varying voltages, comprising:
a linear elastic body having a top surface and a bottom surface opposite each other, and having conductivity;
first and second electro-mechanical conversion elements formed on the top surface of said elastic body, adjacent to each other, and having respective first and second electrodes spaced apart from said elastic body and receiving the first and second time-varying voltages, respectively, said first and second electro-mechanical conversion elements harmonically generating a longitudinal vibration and a bending vibration on said elastic body and producing elliptical motions on said elastic body; and
a third electro-mechanical conversion element formed on the top surface of said elastic body and arranged at a position such that a center of said third electro-mechanical conversion element is offset from a node of at least one of said longitudinal and bending vibrations on said elastic body, to convert the longitudinal and bending vibrations to electrical output signals.

15. The vibration motor as claimed in claim 14, further comprising:
a fourth electro-mechanical conversion element formed on the top surface of said elastic body, to transmit an electric potential of said elastic body to an external circuit.

16. The vibration motor as claimed in claim 15, wherein each of said first through fourth electro-mechanical conversion element are formed in a single electro-mechanical conversion material.

17. The vibration motor as claimed in claim 15, wherein the first and second time-varying voltages have a same frequency and a phase difference of $\pi/2$ with respect to each other.

18. The vibration motor as claimed in claim 15, further comprising:
a third electrode formed on said third electro-mechanical conversion element and spaced apart from said elastic body;
a fourth electrode formed on said fourth electro-mechanical conversion element and spaced apart from said elastic body; and
wherein each electrode of said first through fourth electro-mechanical conversion elements are baked onto a surface of the respective electro-mechanical conversion element.

19. The vibration motor as claimed in claim 14, wherein said first and second electro-mechanical conversion elements have a polarity in a same direction as each other.

20. The vibration motor as claimed in claim 14, wherein said first and second electro-mechanical conversion elements have a polarity in an opposite direction as each other.

21. The vibration motor as claimed in claim 14, further comprising first and second protuberances spaced apart from each other, extending from the bottom surface of and perpendicular to said elastic body, wherein the elliptical motions are produced at positions of said elastic body corresponding to said first and second protuberances.

22. The vibration motor as claimed in claim 15, further comprising first and second protuberances spaced apart from each other, extending from the bottom surface of and perpendicular to said elastic body, wherein the elliptical motions are produced at positions of said elastic body corresponding to said first and second protuberances.

23. The vibration motor as claimed in claim 21, wherein said third electro-mechanical conversion element is asymmetrical with respect to an imaginary plane perpendicular to the top and bottom surfaces of said elastic body and cutting through the center of the one of said first and second protuberances nearest said third electro-mechanical conversion element.

24. The vibration motor as claimed in claim 22, wherein said third electro-mechanical conversion element is asymmetrical with respect to an imaginary plane perpendicular to the top and bottom surfaces of said elastic body and cutting through the center of the one of said first and second protuberances nearest said third electro-mechanical conversion element.

25. The vibration motor as claimed in claim 15, further comprising:
a drive control circuit comprising;
an oscillator to generate output voltages having frequencies corresponding to the longitudinal and bending vibrations on said elastic body;
a phase shifter to shift the output voltages by a predetermined phase to generate phase shifted voltages;
said output voltages and phase shifted voltages being used as the first and second time-varying voltages, respectively; and
a comparator comparing a pre-set voltage with said electrical output signals from said third electro-mechanical conversion element to generate a comparison signal, said comparison signal being transmitted to said oscillator to adjust a frequency of the output voltages.

26. The vibration motor as claimed in claim 15, wherein each of said first through fourth electro-mechanical conversion elements is a piezoelectric element.

27. The vibration motor as claimed in claim 14, wherein an imaginary line which bisects said third electro-mechanical conversion element and is perpendicular to the direction of said longitudinal vibration is offset from the node of at least one of the vibrations on said elastic body.

28. The vibration motor as claimed in claim 27,
wherein said first vibration is a longitudinal vibration which vibrates in a direction substantially parallel to the plane, and the second vibration is a bending vibration which vibrates in a direction substantially perpendicular to the direction of the first vibration.

29. A vibration motor comprising:
a vibration member including an elastic body; and
an electro-mechanical converting element which is attached to a plane of the elastic body and has first and second input portions;
wherein said vibration member generates a first vibration and a second vibration by applying a first periodic signal to the first input portion of the electro-mechanical converting element and a second periodic signal with different phases from the first periodic signal to the second input portion of the electro-mechanical converting element, so as to produce elliptic motions on the elastic body without generating a travelling wave; and wherein said electro-mechanical converting element has an output portion which is arranged separately from said first and second input portions and at a position such that a center of the output portion is offset from a node of at least one of the first and second vibrations, and converts at least one of the first and second vibrations to an electrical signal.

30. A vibration motor comprising:

an elastic body having first and second surfaces opposite each other, said elastic body having conductivity;

an electro-mechanical converting element connected to the first surface of said elastic body, and having an electrode to receive an electric energy, to harmonically generate a longitudinal vibration and a bending vibration on said elastic body, and to produce elliptical motions on said elastic body; and an output portion spaced apart from said electrode and connected to the first surface of said elastic body and arranged at a position such that a center of said output portion is offset from a node of at least one of said longitudinal and bending vibrations on said elastic body, to convert the longitudinal and bending vibrations to an electrical signal.

31. A vibration motor which receives first and second time-varying voltages, comprising:

a linear elastic body having a top surface and a bottom surface opposite each other, and having conductivity;

an electro-mechanical converting element formed on the top surface of said elastic body and having an electrode spaced apart from said elastic body and receiving the first and the second time-varying voltages, said electro-mechanical converting element harmonically generating a longitudinal vibration and a bending vibration on said elastic body and producing elliptical motions on said elastic body; and an output portion spaced apart from said electrode and formed on the top surface of said elastic body and arranged at a position such that a center of said output portion is offset from a node of at least one of said longitudinal and bending vibrations on said elastic body, to convert the longitudinal and bending vibrations to an electrical output signal.

* * * * *